United States Patent
Führer

(10) Patent No.: US 6,543,594 B1
(45) Date of Patent: Apr. 8, 2003

(54) SYNCHRONIZATION DEVICE

(75) Inventor: Gerhard Führer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/743,388

(22) PCT Filed: Jul. 8, 1999

(86) PCT No.: PCT/EP99/04791

§ 371 (c)(1),
(2), (4) Date: Jan. 9, 2001

(87) PCT Pub. No.: WO00/04299

PCT Pub. Date: Jan. 27, 2000

(30) Foreign Application Priority Data

Jul. 14, 1998 (DE) .......................... 198 31 503

(51) Int. Cl.⁷ ............................ F16D 23/00; F16D 11/00
(52) U.S. Cl. .................................... 192/53.32; 192/53.1
(58) Field of Search .......................... 192/53.32, 53.31, 192/53.1

(56) References Cited

U.S. PATENT DOCUMENTS

| | | | |
|---|---|---|---|
| 1,803,535 A | * 5/1931 | Murray | 192/53.1 |
| 2,627,955 A | 2/1953 | Perkins | 192/53 |
| 4,356,901 A | 11/1982 | Koehler et al. | 192/70.2 |
| 4,811,825 A | * 3/1989 | Christian et al. | 192/53.32 |
| 5,678,670 A | * 10/1997 | Olsson | 192/53.31 |
| 5,921,362 A | 7/1999 | Bailly et al. | 192/53.32 |

FOREIGN PATENT DOCUMENTS

| | | |
|---|---|---|
| DE | 738 514 | 7/1943 |
| DE | 1 871 879 | 5/1963 |
| DE | 26 38 902 | 10/1977 |
| DE | 32 08 945 A1 | 9/1983 |
| DE | 195 06 987 A1 | 8/1996 |

* cited by examiner

Primary Examiner—Jack Lavinder
Assistant Examiner—Melody M. Burch
(74) Attorney, Agent, or Firm—Davis & Bujold, P.L.L.C.

(57) ABSTRACT

The invention relates to a synchronization device (2) for torque-transmitting components (4, 6, 8) of a transmission comprising a disk set (40) which has several disks (82) and a synchronizer sleeve (30) connected to a shifting device (64). The synchronizer system (2) has mechanisms (82, 84, 86, 88, 90, 92, 94) that divide the torque among the torque transmitting components (4, 6, 8) into an initial lower torque and a subsequent larger synchronizing torque. This is preferably achieved by a gradation of the disk (82) that enables a successive engagement of the disks on the torque transmission.

5 Claims, 3 Drawing Sheets

Fig. 4
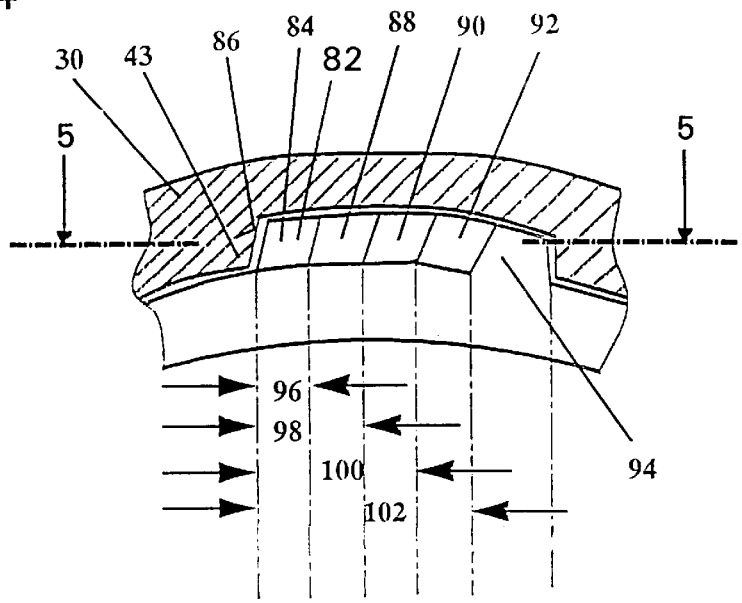
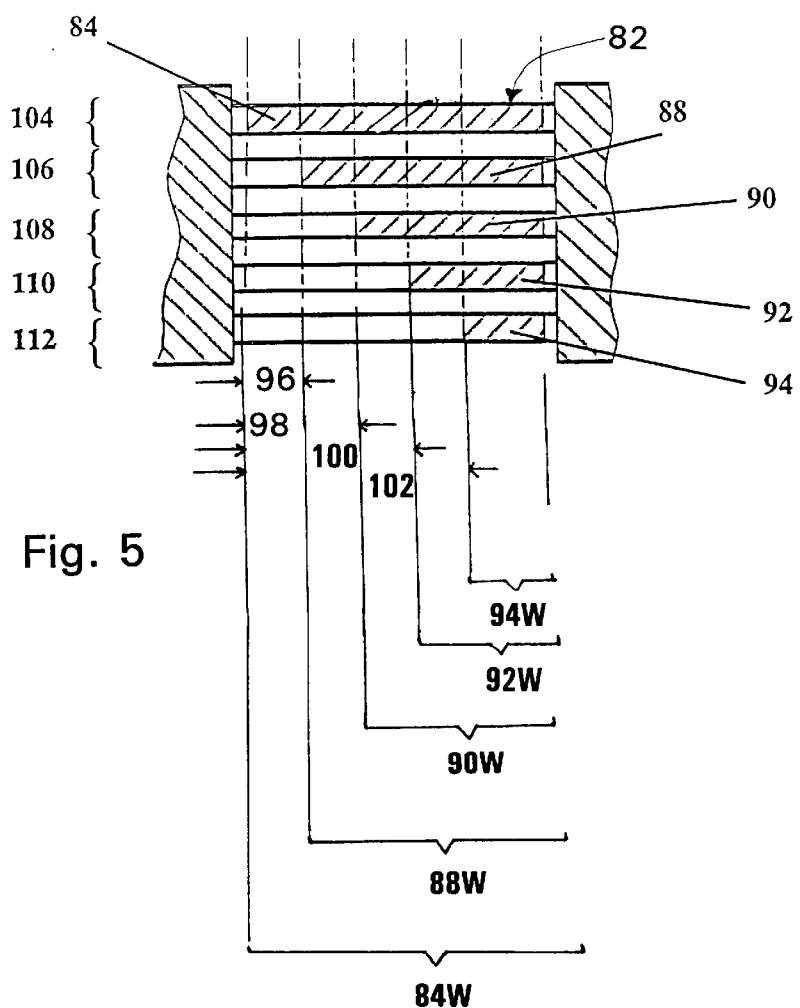
Fig. 5

SYNCHRONIZATION DEVICE

FIELD OF THE INVENTION

The invention relates to a synchronization device.

BACKGROUND OF THE INVENTION

Multi-step gear wheel transmissions are at present being practically exclusively used for transmitting the input power and adapting the motor torque to the traction requirement of a vehicle.

The shift system of the transmission can be considerably simplified with the aid of a synchronization device. In the synchronization, the rotational speed adaptation of the transmission components to be interconnected is carried out automatically or controlled in order to prevent double declutching during upshifts or double declutching with high switching of the throttle during downshifts. The traveling safety is clearly improved since the change of gears is quickly, safely and also noiselessly possible even under critical driving situations, e.g. when driving downhill the driver's right foot can remain on the brake during a downshift.

A synchronization system has the following tasks to perform:

rotational speed adaptation of two transmission components and the parts connected therewith that rotate at different speeds so that they can be interconnected with positive fit without grating noise;

locking of the positive-fit connection until synchronous speed of the transmission components to be connected is reached in order to prevent grating and damages of the positive-fit shifting components;

release of the lock at the moment of synchronous speed;

rotational speed adaptation within the shortest time and with the least possible shifting forces;

operational safety even under unfavorable circumstances such as in case of cold, viscous oil or of extremely quick breaking of the gears.

In the synchronized vehicle transmissions existing at present, synchronization devices for each separate gear are mostly used.

Lock synchronization with cones has been broadly extended at the same time. In this system, friction cones are used for the force-locking rotational speed adaptation of the transmission components to be connected. This kind of synchronization is used in the transmissions both of passenger cars and of industrial vehicles.

The customary synchronization devices make the three basic functions of the synchronization available:

often arbitrary lockable and releasable connection of two parts rotating around a common axis;

energy transmission to or energy drawing from a rotary part (acceleration, deceleration); and adjustment of the rotational speed difference between two parts rotating around a common axis to a value equal to or near zero.

In synchronization systems with friction disks, the conical friction members are replaced by a number of disks which rub against each other during rotational speed compensation. In one version, disks axially abutting on each other in a sequence are connected with the synchronizer ring or the transmission shaft or, on the other hand, with the clutch body on the gear wheel or with the gear wheel itself. Such a synchronization system which, e.g. can also be equipped with a reinforcer device of the synchronizing force, has been disclosed in DE 32 08 945 A1.

From DE 195 06 987 A1 is known as a generic form fit gear clutch, the synchronizer sleeve of which is formed by an outer driver ring in which a shift fork engages, and by a shift hub which is non-rotatably but axially movably situated upon a synchronizer body. The shift hub carries selector teeth which interact with a dog clutch on a clutch body. The front faces of the selector teeth and the dog clutch are in corresponding revolution surfaces so that they bluntly strike on each other under axial shift movement. The clutch body is non-turnably but axially, elastically and flexibly connected with a gear wheel rotatably supported upon a transmission shaft.

Between the synchronizer body, non-rotatably connected with the transmission shaft, and the driver ring, is situated a slipping clutch in the form of a spring-loaded, lined multi-disk clutch, the driver ring being designed as an outer disk carrier and the shift hub as an inner disk carrier. On the front side of the shift, hub lids are mounted which, with radial play, extend toward the driver ring and between which the lined disks support themselves under the pressure of a corrugated spring.

The outer periphery of the driver ring carries a meshing gear which interacts with driver teeth of a driver which is connected with the gear wheel non-rotatably, but axially and elastically flexible. The teeth of the driver are narrower than the tooth gaps so that in the peripheral direction an abundant play is formed which facilitates meshing of the meshing gear during shifting. The front faces of the driver teeth and of the meshing gear are in a conical revolution surface so as to form an angle in the axial direction toward the peripheral surface and toward the front face of the driver.

If the synchronizer sleeve is moved from its neutral position in the shifting position direction, the meshing gear of the driver ring first comes into contact and engagement with the teeth of the driver so that a slipping torque is transmitted, via the lined disks, from the gear wheel to the transmission shaft. The torque depends on the number of disks, the radius of the disks and the force of the corrugated spring. The necessary time in order to produce the synchronous speed between the gear wheel and the transmission shaft is decisive. Locking surfaces on the driver teeth prevent the shift teeth of the hub part coming into contact with the dog clutch before an approximately synchronous speed has been reached between the gear wheel and the transmission shaft.

It is obtained through the front faces extending into the revolution surface of the driver teeth, of the meshing gear, of the dog clutch, and of the selector teeth, that torques produced by the transmission components to be coupled exert no reaction forces on the shifting force. In addition, due to the axial flexibility of the driver and of the clutch body, contact impacts on the driver teeth and dog clutch are softly trapped thus over the whole shift stroke, a relatively uniform shifting force results which improves operating comfort.

Internal disks are customarily coated on both sides while the outer disks are uncoated steel disks, but disks coated on one side can also be used.

Disk synchronization, according to the prior art, has the disadvantage that in the range of the meshing gear, wear can be found which is generated due to the impingement of the tooth front edges and front surfaces during full differential rotational speed.

The problem on which the invention is based is to reduce the wear in the area of the meshing gear.

SUMMARY OF THE INVENTION

The height of the meshing pulse directly depends on the friction torque of the disks. The lower the friction torque of the disks, the smaller is the pulse and the wear. It is proposed, according to the invention, to provide on the synchronization system means which, upon engagement, divide the torque transmitted among the teeth of the synchronizer sleeve and the teeth on the clutch body into an initial lower meshing torque and a subsequent larger synchronizing torque.

In an advantageous design, the means are formed by grading of the disks enabling a successive engagement of the disks of the synchronization system in the torque transmission.

Another advantageous embodiment shows the grading of the disks in a manner such that at least one first step is provided to form the meshing torque and at least one second step to form the synchronizer torque.

Another advantageous design on the first step has two friction surfaces to form the small meshing torque and on the second step ten friction surfaces to form the synchronizer torque.

In another advantageous embodiment, the step between the engagement of two successive disks is formed so that the shifting vibrations are reduced.

When the teeth move on the synchronizer sleeve in the direction of the teeth on the clutch body of a transmission part to be engaged, in the first step, the driver teeth of the disks grips only the edge of the synchronizer sleeve first, with at least one disk, in order to produce with the disk and appertaining friction surfaces a friction torque corresponding to a meshing torque. The build up of the meshing torque is earlier than the build up of the synchronizer torque proper, which should cause the approximation of rotational speed. Due to the prior meshing torque, the engaging torque stops are kept out of the synchronization system which would result if from the start the synchronization operation were begun with the full friction torque of all disks. Thus a practically easy pre-synchronization takes place followed by the real synchronization.

BRIEF DESCRIPTION OF THE DRAWINGS

The invention, is explained in detail with reference to drawings which show:

FIG. 4 is one other side view in section; and

FIG. 5 is a top view according to FIG. 4.

DESCRIPTION OF THE PREFERRED EMBODIMENTS

Figure 1:
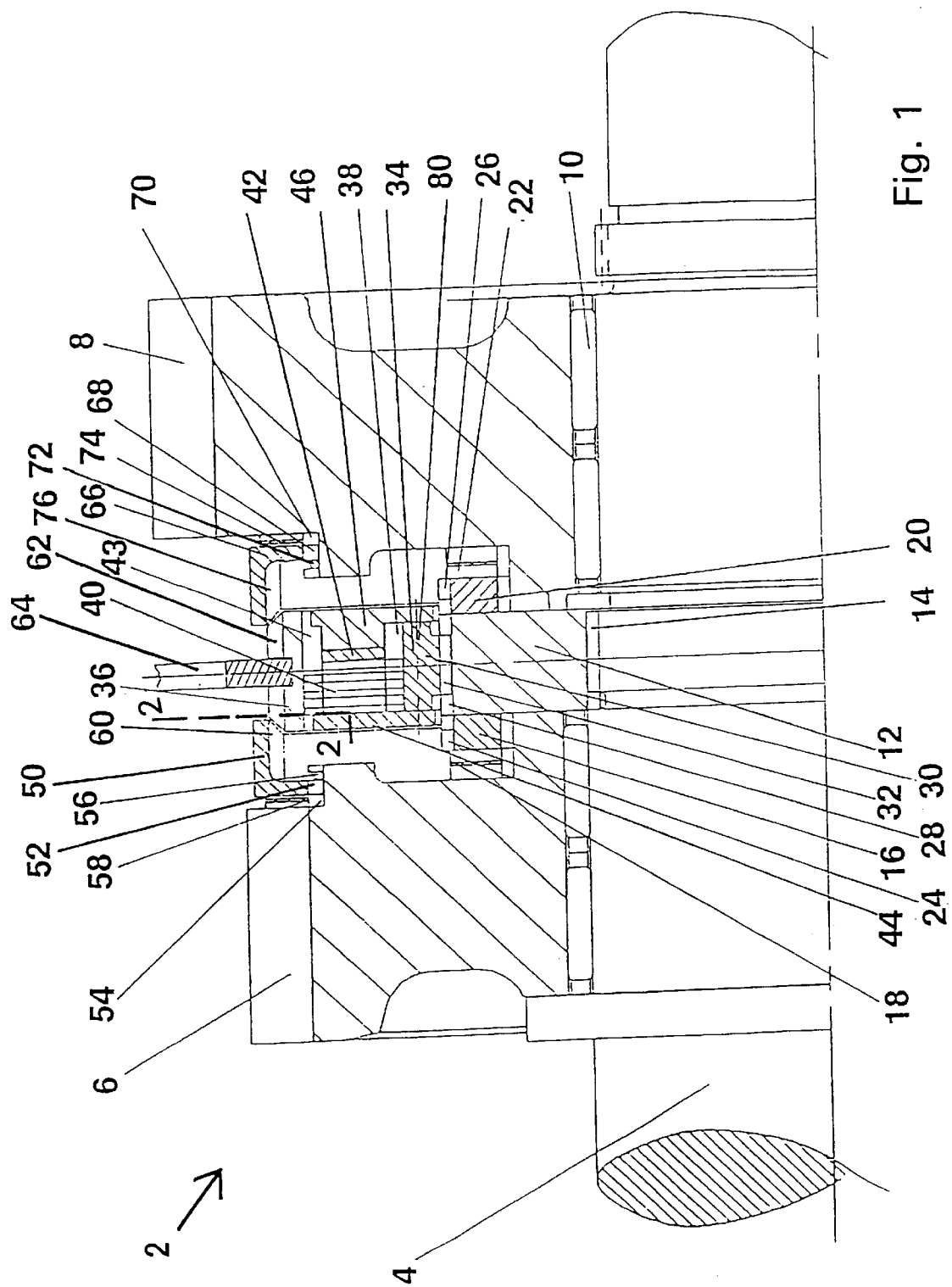
FIG. 1 is a representation of a disk synchronization system.

FIG. 1 shows the representation of the inventive synchronization device 2. On a transmission shaft 4, two gear wheels 6 and 8 are axially fixed, but freely rotatably situated. To that end, the gear wheels 6 and 8 are supported on bearings, such as needle bearings 10, so that they can rotate as friction free as possible around the transmission shaft 4. Between the gear wheels 6 and 8, and upon the transmission shaft 4, a synchronizer body 12 is placed which is non-rotatably connected, preferably via teeth 14, with the transmission shaft 4. Between the synchronizer body 12 and the gear wheel 6, a clutch body 16 and a spring device 18 are provided. The spring device 18 is designed, e.g. as corrugated spring and cushions the clutch body 16 in the direction of the synchronizer body 12. Between the synchronizer body 12 and the gear wheel 8, a clutch body 20 and a spring device 22 are provided. The spring device 22 is also designed, e.g. as a corrugated spring and cushions the clutch body 20 in the direction of the synchronizer body 12. The clutch body 16 has a dog gear 24 as outer toothing. The clutch body 20 also has a dog gear 26 as outer teeth. The synchronizer body 12 has an outer teeth 28 in which the synchronizer sleeve 30 by inner teeth engages. The synchronizer sleeve 30 with its inner teeth is axially movable in the outer teeth 28. The inner teeth of the synchronizer sleeve 30 act as a dog gear 32, together with the dog gears 24 and 26, on the clutch bodies 16 and 20. The dog gears 24, 26, 32 can be designed blunt, i.e. without sharp points. The ends of the dog gears 24, 26, 32 can be provided on the corners with rejecting bevels which prevents possible engagement at inadmissibly high rotational speeds. In addition, the taper rolling of the teeth of the dog gears 24, 26, 32 proves advantageous since a self-locking connection is obtained between the dog gears 32 of synchronizer sleeve 30 and the clutch body 16, 20, which prevents an undesired tripping of the gears. Additionally, on its outer periphery, the synchronizer sleeve 30 has outer teeth configured in the shape of gripping tooth 62, as explained in detail in FIG. 2. In the outer periphery, a groove can be provided in which a shift fork 64 of a shifting device can advantageously engage.

The synchronizer sleeve 30 has an inner disk carrier 34 and an outer disk carrier 36. The disk carrier 34 meshes, e.g. by outer teeth 38, in corresponding teeth on separate disks of a disk set 40. The disk carrier 36 for its part engages, e.g. by an.inner teeth 43, likewise in corresponding teeth on other disks of the disk set 40. At the same time, one disk connected with the disk carrier 34 follows in axial sequence upon one disk connected with the disk carrier 36, whereby, when the disk carriers 34 and 36, respectively, turn against each other, the disks of the disk set 40, rub against each other. The friction surface of the disks preferably consists of paper, but other materials with favorable frictional properties, such as molybdenum friction linings or sintered friction linings, can be used. To obtain a small axial extension of the synchronizer sleeve, the number of disks must be limited, e.g. to three disks for each of the disk carriers 34 and 36. By a spring device, such as a plate spring 42, the disk set 40 is set in the axial direction under a defined prestress, the disk set 40 being pressed by the plate spring 42 against a first part 44 connected with the inner disk carrier 34. The plate spring 42 abuts on the other side on a second part 46 and supports itself axially in relation thereto. The second part 46 is likewise connected with the inner disk carrier 34 in the form, e.g. of a rivet 80 diagrammatically shown here. Screw connections or an arrangement with pins and guard rings can also be used. The parts 44 and 46, which can be designed, e.g. in the form of metal plates, are freely rotatable relative to the outer disk carrier 36. On the gear wheel 6 is provided a gripping device 50 which is non-rotatably connected with the gear wheel 6 via inner teeth 52 by outer teeth 54 on the gear wheel 6. In the outer teeth 54, the gripping device 50 with its inner teeth 52 is axially movable with limitation. At the same time, the gripping device 50 is axially limited on one side by a stop on the gear wheel 6 and on the other side by a safety device such as a guard ring. Between the gripping device 50 and a stop on the gearwheel 6, a spring device, such as a corrugated spring 58, can be provided by which the gripping device 50 is axially cushioned relative to the synchronizer sleeve 30. The gripping device 50 has gripping teeth 60 axially oriented in the direction of the synchronizer sleeve 30 which is explained in detail in FIG. 2. The gripping teeth 60 are adapted to mesh in the gripping teeth 62 on the synchronizer sleeve 30.

On the gear wheel 8 is provided a gripping device 66 which is non-rotatably connected with the gear wheel 8 via inner teeth 68 by ah outer teeth 70 on the gear wheel 8. In the outer teeth 70, the gripping device 66 with its inner teeth 68 is axially movable with limitation. At the same time, the gripping device 66 is axially limited on one side by a stop on the gear wheel 8 and, on the other side, by a safety device such as a guard ring 72. Between gripping device 66 and stop on the gear wheel 8 can be provided a spring device, such as a corrugated spring 74, by which the gripping device 66 is axially cushioned relative to the synchronizer sleeve 30. The gripping device 66 has gripping teeth 76 axially oriented in the direction of the synchronizer sleeve 30 which is explained in detail in FIG. 2. The gripping teeth 76 are adapted to mesh in the gripping teeth 62 on the synchronizer sleeve 30.

The disk carriers 34 and 36 with the disk set 40, together with parts 44 and 46 and the plate spring 42, form a common axially movable homogeneous shifting set. To move the shifting set, an actuation element, such as the shift fork 64, meshes in an externally circular recess in the outer disk carrier 36 of the synchronizer sleeve 30.

If one of the loosely rotating gear wheels 6 or 8 should now be connected with a transmission shaft 4 having a different rotational speed, the homogeneous shifting set is moved in the direction of the gear wheel to be coupled. Due to the movement, the outer disk carrier 36 comes into contact with the gripping device 50. The gripping device 50, cushioned by the corrugated spring 58, can axially turn aside the disk carrier 36. In the areas where disk carrier 36 and gripping device 50 make contact, the two parts have gripping teeth 60, 62. Due to the small bulk of the gripping device 50 and under the axially acting tension of the corrugated spring 58, the gripping device 50 with the gripping teeth 60 will mesh at the adequate moment, i.e. when passing a tooth gap, in the gripping teeth 62 on the disk carrier 36. By virtue of the meshing, the gripping device 50 can transmit a torque from the outer disk carrier 36 to the gear wheel 6 and vice versa. If the torque exceeds a limit value, adjustable by the number of disks and design of the plate spring or restraint of the plate spring, the disk set begins to slip. The use of paper disks is convenient here, since the difference between static friction and sliding friction can be kept low.

The existing differential rotational speed between the gear wheel 6, the inert rotary masses connected therewith, and the transmission shaft 4 causes the torque that turns the friction disks against each other. A dynamic shock operation due to the sudden acceleration of inert rotary masses is prevented by the multi-disk clutch and confines itself only to the abrupt acceleration of the outer disk carrier 36 and of the friction disks connected therewith. The inventive construction makes it possible to keep the inert masses very small. The rotational energy contained in the freely turning inert messes during deceleration and the missing energy during acceleration are transmitted via the slipping multi-disk clutch. In this synchronization phase, the slipping multi-disk clutch takes over the function of rotational speed compensation. In this synchronization phase, the whole shifting set is further displaced in the direction of the gear wheel 6. The shifting set is guided here into teeth 28, 32 between inner carrier 30 and synchronizer body 12. After a defined displacement path, the dog gear 32 of the inner disk carrier comes into contact with the outer dog gear 24 on the clutch body 16. The clutch body 16 can axially set aside the inner disk carrier 30 due to its cushioning by the corrugated spring 18.

When the dog gears 24, 32 are designed with blunt ends, the blunt front faces are one upon the other probably more under prestress of the springs. If a meshing has accidentally occurred, the shifting operation is terminated altogether. Otherwise in the state of braced superposition of the teeth, the vehicle clutch becomes closed and the torque that builds up turns the teeth against each other. The teeth mesh and the gear shift is terminated. A premature turning of the teeth against each other and a subsequent meshing are also possible by slip torques on the wheel set of the transmission.

If, for example, the gear shift is not manually carried out by a driver by selector linkage, the alternative of an automatic gear shift is also possible by shifting means by remote control operated by the driver. The remote actuation is also possible with intercalation of a logical control which takes action on the shiftable gear steps. Without the driver's influence, an automatic system can also take over the whole gear shift of the transmission, the shift being preferably effected in the optimum ranges.

Pneumatically or electrically actuated shifting means are mostly used as shifting means. Hydraulically actuated shifting means can also be used.

By the elimination of the meshing slopes on the dog gears, a shorter shift stroke can be achieved. This gain in stroke can be used for enlarging the ratio between shift lever and synchronizer sleeve. The shift and selector strokes on the shift lever under small shifting forces thereby can be definitely reduced.

The cushioned superposition of the dog gears of the synchronizer sleeve and clutch body imparts to the driver an improved shifting feel and makes possible high rotational speeds when shifting.

The proposed synchronization system can be used to special advantage in automatic synchronization systems having a motor guide where by an engagement in the motor control. A defined differential rotational speed is always available here. In particular, a safe synchronization of the gear steps to be shifted can be obtained at very advantageous costs. The backlash of the torque-transmitting teeth is as low as possible.

A sufficiently long synchronization is needed in the disk set 40 before the dog gears 24, 26, 32, provided for torque transmission, convert the free rotary masses from the friction coupling of the multi-disk clutch to the positive fit of the dog gears, in order to prevent a torque impact of inadmissible magnitude. This can be obtained with the inventive arrangement of the disks in the form of steps.

Figure 2:
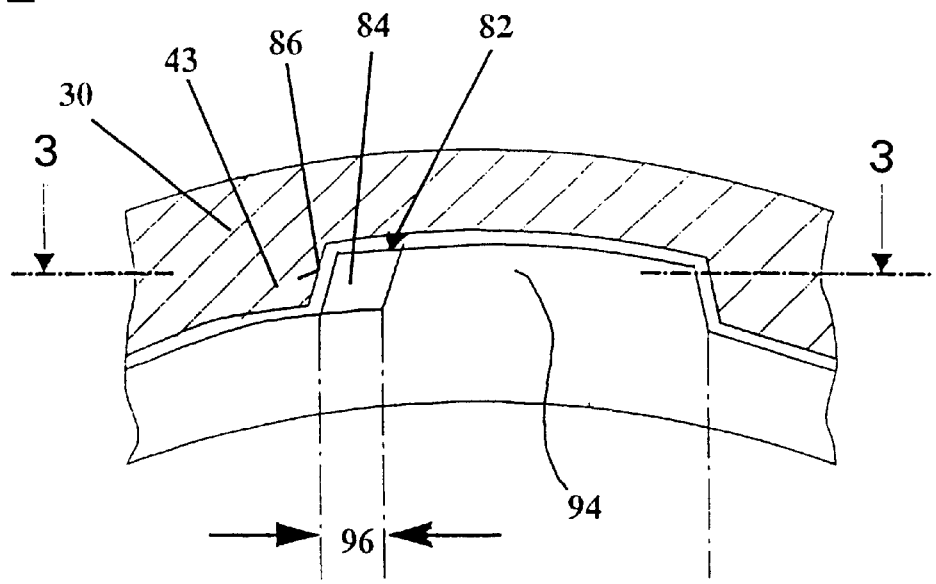
FIG. 2 is a side view in section.
Figure 3:
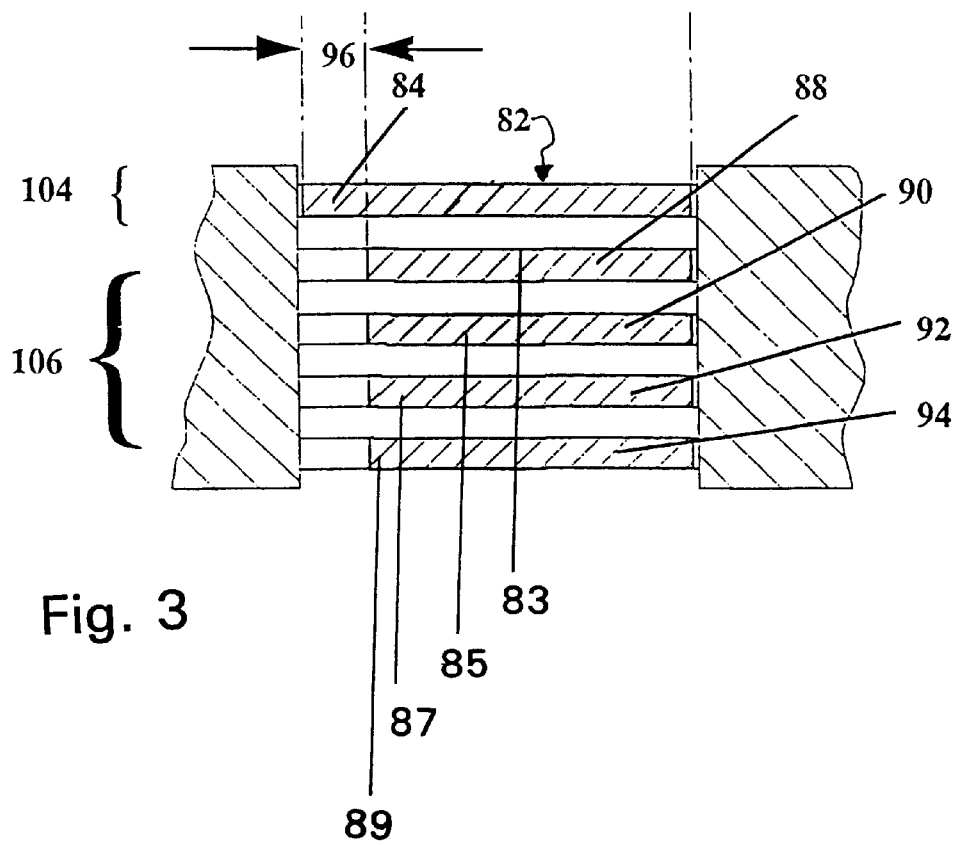
FIG. 3 is a top view according to FIG. 2.

FIG. 3 shows a section through the disk set along the line 3—3 of FIG. 2. The gaps between the tooth 84 on one side and the teeth 88, 90, 92 and 94 can easily be detected here.

In another advantageous design, FIG. 4 shows a section through the disk set 40 along the line 2—2 of FIG. 1 in another advantageous design. As a first step 104, a first disk 82 with its tooth 84, which extends into the synchronizer sleeve 30, abuts with slight play on the edge 86 of the inner tooth 43 of the synchronizer sleeve 30. The other teeth 88, 90, 92, 94 (FIG. 3) form other steps 106, 108, 110, 112 and opposite to the edge 86, have gaps 96, 98, 100, 102 which increase from tooth to tooth. Thereby the teeth 88, 90, 92, 94 abut gradedly on the edge 86 only later than the tooth 84. Thus the disk 82 with its friction faces can first transmit the meshing torque while the friction faces of the other disks are used only with graded delay to transmit the synchronizing torque. As soon as the gripping device 50 meshes in the gripping teeth 62 of the synchronizer sleeve 30 (FIG. 1), the tooth 84 abuts first on the edge 86 and transmits the meshing torque. Only after a delayed crossing of the gap 96, the tooth 98 abuts on the edge 86. After each crossing of another gap, the teeth 90, 92 and 94 abut on the edge 86. Only after abutment of the tooth 94 on the edge 86 do all disks transmit the full synchronizer torque.

The smallest possible mass of gripping teeth and clutch bodies with a preferably cushioned arrangement creates dynamically favorable gripping and meshing mechanics in order to achieve a capture of the gear wheels at a high rotational speed difference and a reliable meshing in the respective opposing teeth with the least wear of the teeth. A rotary elastic arrangement in a peripheral direction to the gripping teeth can constitute a further improvement of the damping behavior during meshing of the gripping teeth.

The gripping teeth can also be disposed on the gear wheels so as to be rotatable on the gear wheels when a high, defined preset friction torque is exceeded, The friction torque is higher than the friction torque in the disk set. By turning, it is possible to dampen high impact peaks of the gripping teeth.

The use of friction disks with paper linings combined to form a set jointly usable for two gear steps creates an advantage in cost. These are also by far more environmentally compatible than, e.g. disks with molybdenum coatings. A disk whose static friction value is less than its sliding friction value constitutes an optimal solution in the process of disk configuration.

The elimination of a locking device likewise reduces the cost of the synchronization system aside from the prevention of all often arising locking problems.

What is claimed is:

1. A synchronization device for synchronizing first and second torque-transmitting parts of a transmission by, the synchronization device comprising:
    a first disk carrier connectable to the first torque-transmitting part,
    a second disk carrier connectable to the second torque-transmitting part, and
    a disk set having
        a first disk and a second disk mounted to the first disk carrier, and
        a corresponding first disk and a corresponding second disk mounted to the second disk carrier, and
        the first and second disks of the first and second disk carriers having friction surfaces to couple torque between the first and second disk carriers, and
    at least one of the disk carriers being actuated by a clutch device to engage the first and second disks of the first and second disk carriers, and
    the first disk and the second disk mounted to the first disk carrier by a plurality of teeth spaced apart by a fixed distance to receive corresponding teeth of the first disk carrier, wherein
    widths of the teeth of the second disk mounted to the first disk carrier are less than the width of the teeth of the first disk mounted to the first disk carrier, so that the teeth of the second disk mounted to the first disk carrier mate with the teeth of the first disk carrier subsequent to the teeth of the first disk of the first disk carrier and in a succession to provide a lower initial meshing torque and a larger subsequent synchronizing torque.

2. The synchronization device according to claim 1 wherein:
    teeth of the first disk mounted to the second disk carrier mate at the start of a synchronization with the teeth of the second disk carrier to provide the initial meshing torque in, a first single step, and
    teeth of the second disk mounted to the second disk carrier mate with the teeth of the second disk carrier subsequent to the mating of the teeth of the first disk mounted to the second disk carrier with the teeth of the second disk carrier to provide the subsequent synchronizing torque in a second single step.

3. The synchronization device according to claim 1, wherein:
    widths of the teeth of the second disk and any subsequent disks mounted to the second disk carrier are substantially equal; and
    the first disk of the second disk carrier mates at the start of a synchronization to provide the initial meshing torque in a first single step, and
    the second disk and subsequent disks of the second disk carrier mate subsequent to the first disk of the second disk carrier to provide the subsequent synchronizing torque in a second single step.

4. The synchronization device according to claim 1, wherein:
    widths of teeth of the second and any subsequent disks mounted to the second disk carrier are of successively smaller widths, and
    the second disk and subsequent disks mounted to the second disk carrier mate subsequent to the first disk of the second disk carrier in a successive sequence to provide the subsequent synchronizing torque in a corresponding plurality of steps.

5. The synchronization device according to claim 1 wherein a step between the engagement of the first and the second disk mounted to the second disk carrier with the corresponding first disk and second disk of the first disk carrier is selected to reduce engagement vibration in the transmission.

* * * * *